March 10, 1925.

A. A. HOLLE

MOTOR ROAD VEHICLE

Filed July 28, 1924

INVENTOR
Alexander Albert Holle

BY Robert E. Phillips

ATTORNEY

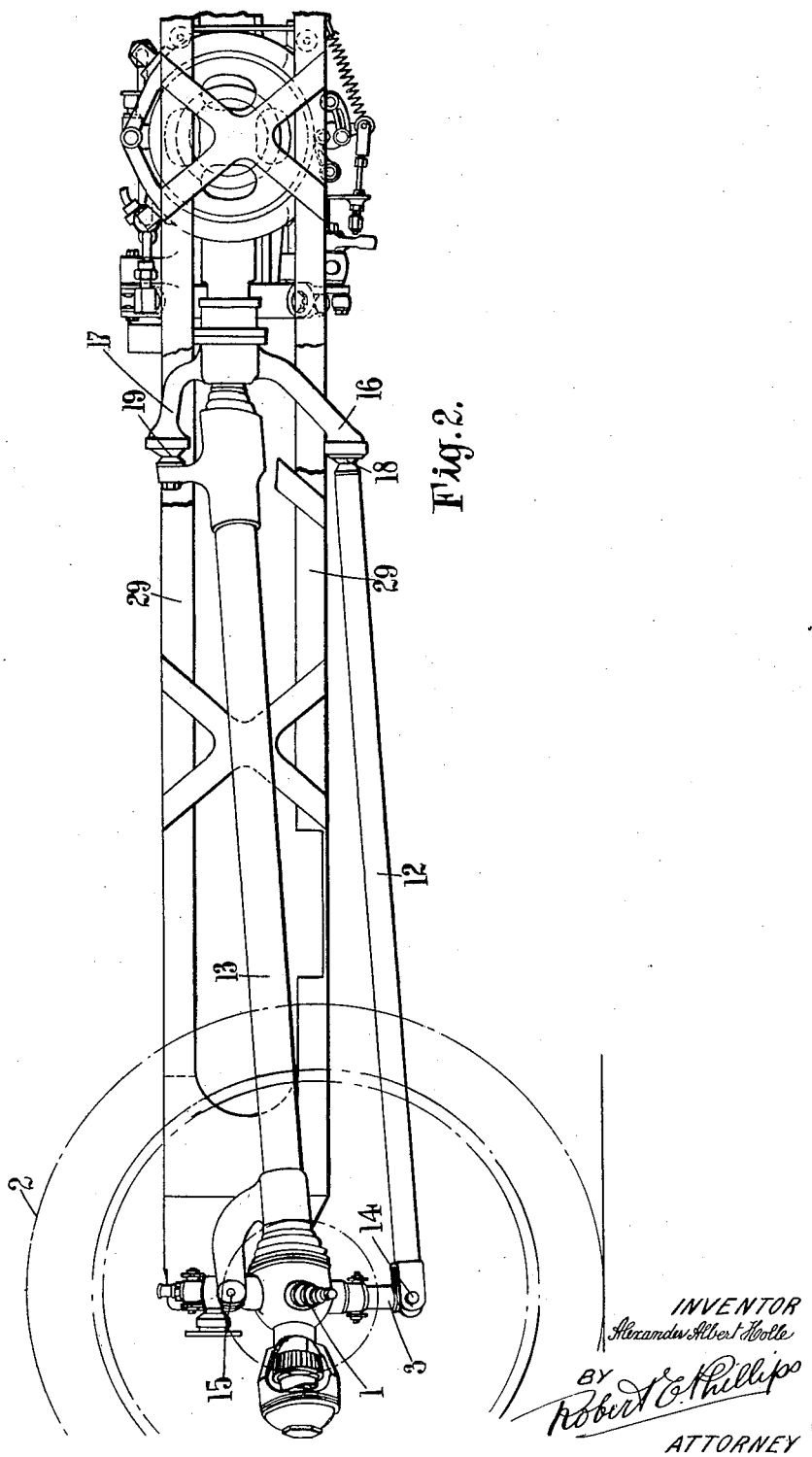

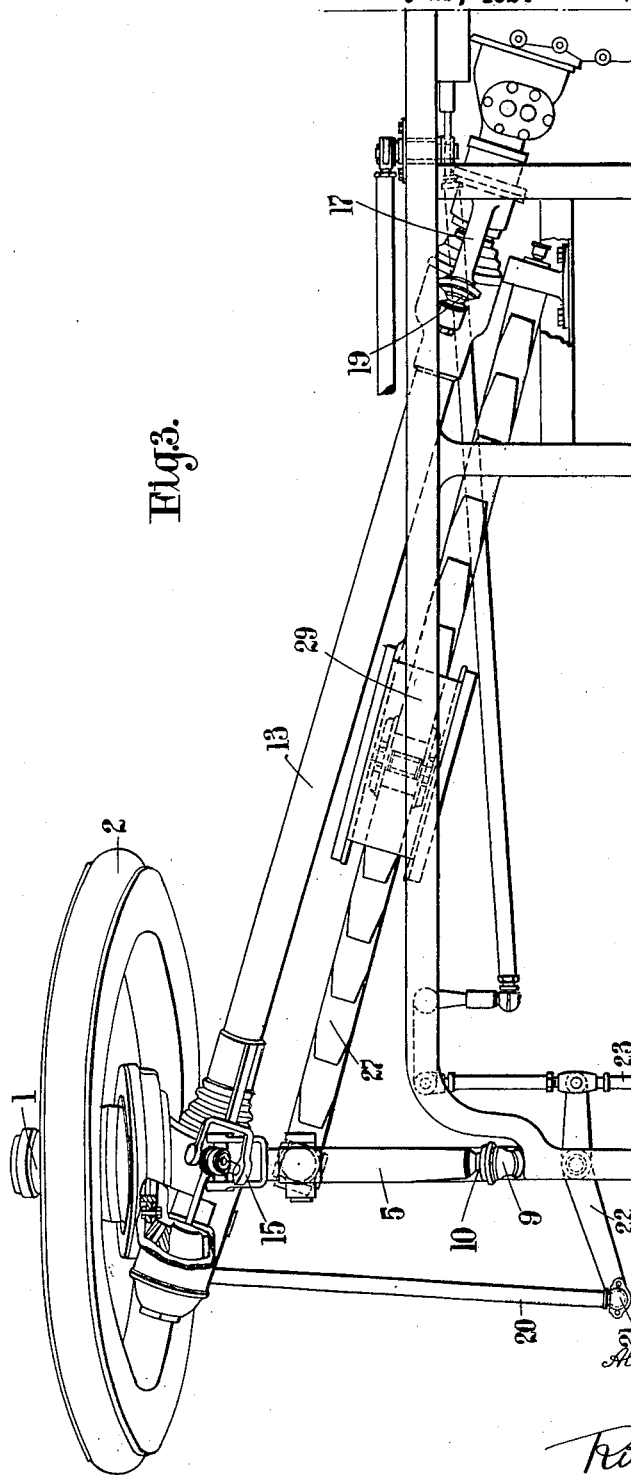

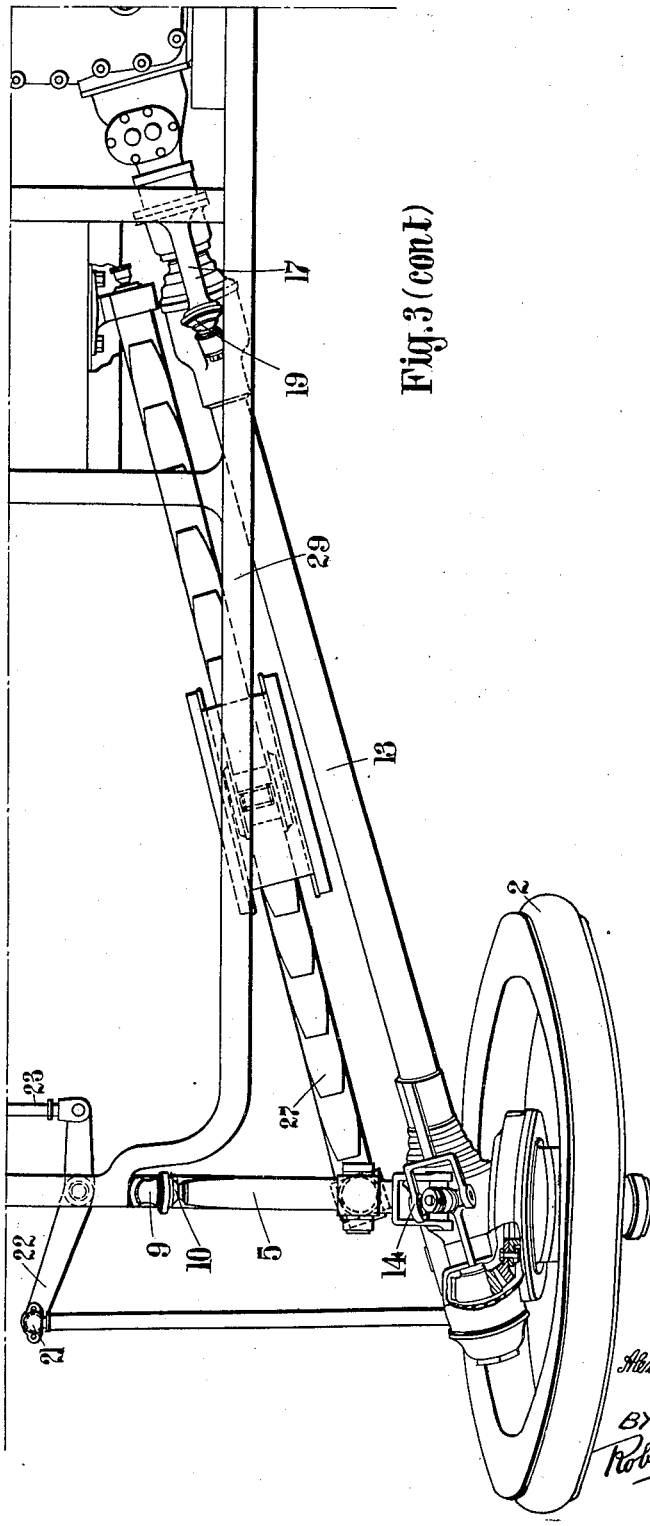

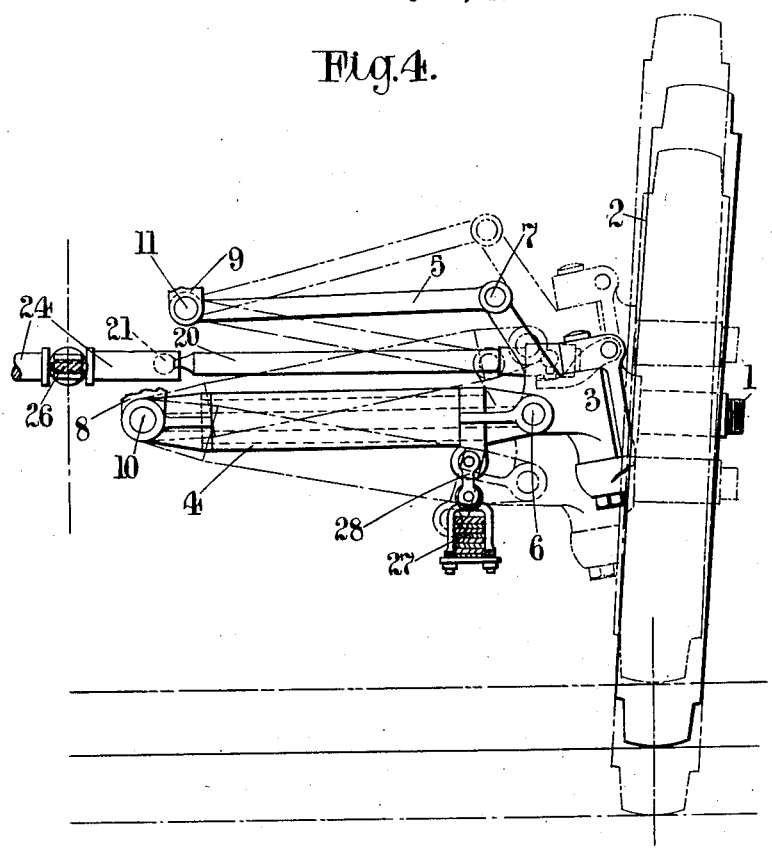
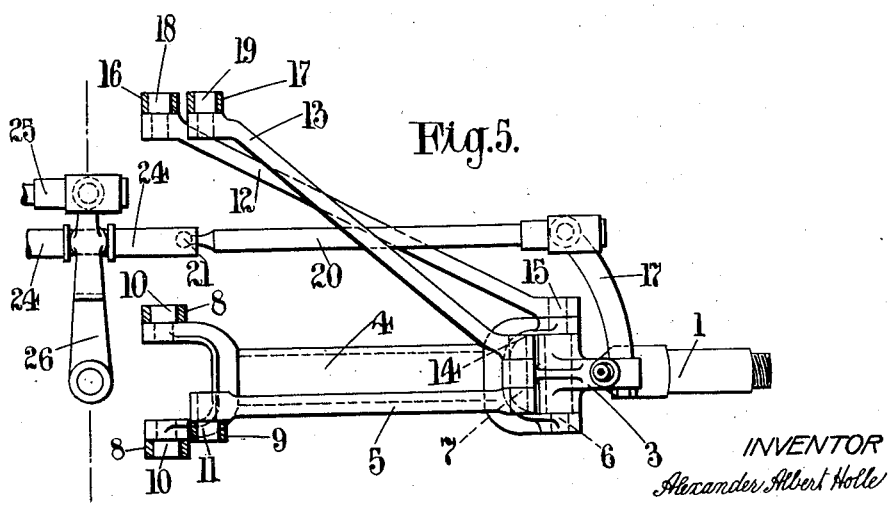

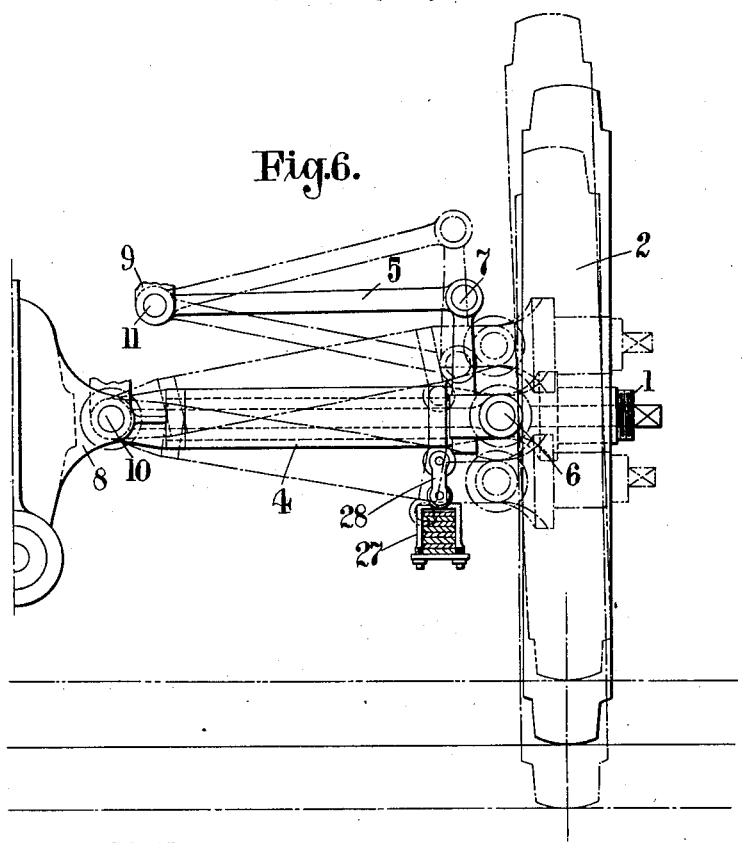
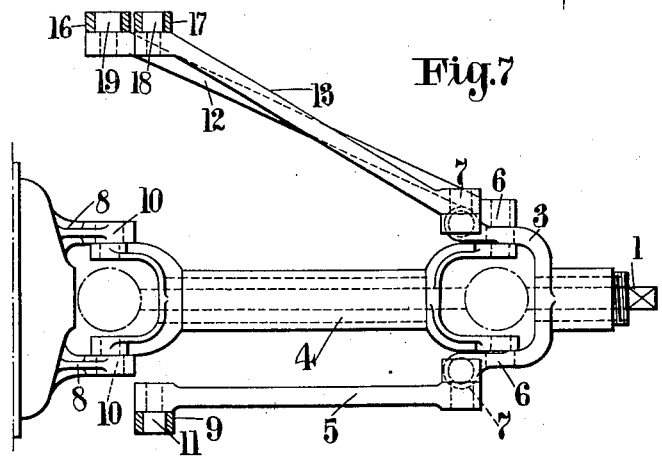

March 10, 1925.  1,529,182
A. A. HOLLE
MOTOR ROAD VEHICLE
Filed July 28, 1924   7 Sheets-Sheet 7

INVENTOR
Alexander Albert Holle
BY Robert E Phillips
ATTORNEY

Patented Mar. 10, 1925.

1,529,182

UNITED STATES PATENT OFFICE.

ALEXANDER ALBERT HOLLE, OF LONDON, ENGLAND.

MOTOR ROAD VEHICLE.

Application filed July 28, 1924. Serial No. 728,791.

*To all whom it may concern:*

Be it known that I, ALEXANDER ALBERT HOLLE, a subject of the Queen of the Netherlands, residing at London, England, have invented a new and useful Improvement in Motor Road Vehicles, of which the following is a full and complete specification.

This invention relates to motor road vehicles and the objects of my improvements are firstly the construction of an undercarriage and running gear which will enable the vehicle to be driven at a high speed over any roads or ground however bad, or however undulating the character of, the surface may be; secondly to relieve the wheels of undue side stresses and the tyres of undue wear and tear; thirdly to relieve the suspension springs of all duties other than suspension; fourthly in road wheels employed for steering purposes to maintain the predetermined angle of castoring constant throughout the movements of said wheels due to irregularities of the road surface; fifthly to eradicate involuntary steering action on the road wheels arising from the rise and fall of the said wheels when they pass over irregularities in the road surface, and lastly to avoid the use of telescopic elements.

Figure 8:
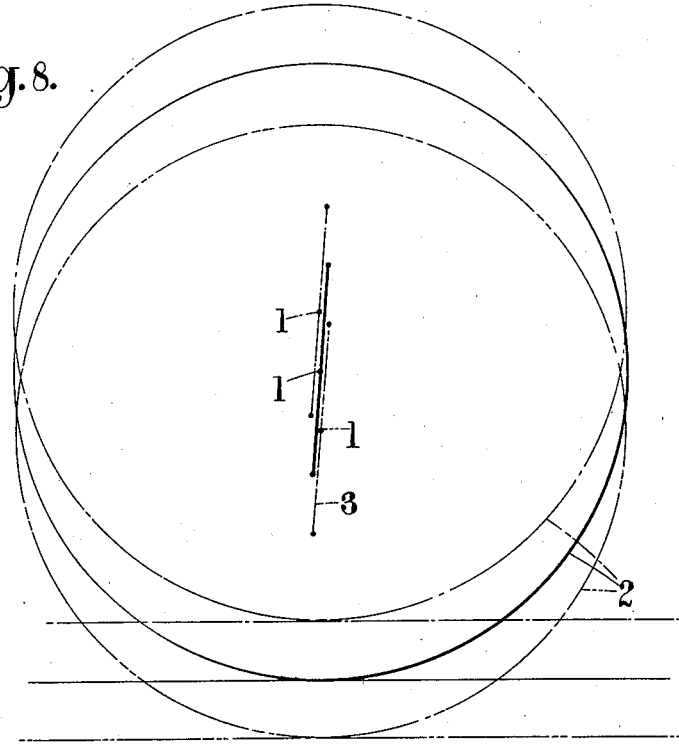
Figure 9:
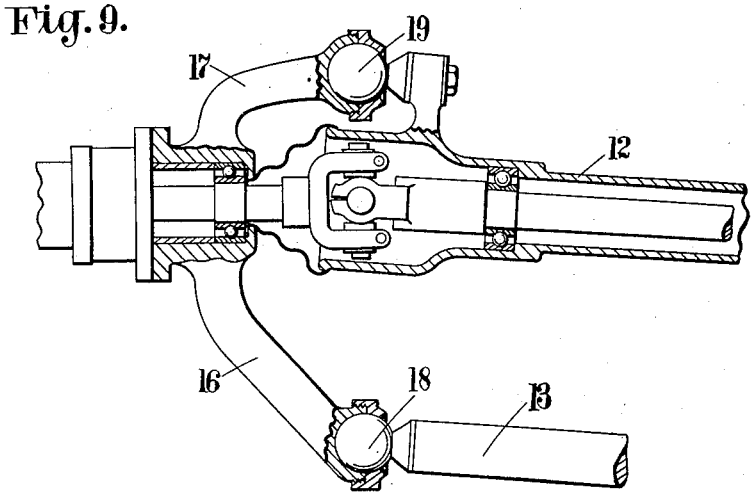

I attain these ends by a construction shown in the accompanying drawings in which:—Figures 1, 2 and 3, are views in front elevation, broken side elevation and broken plan respectively showing the application of the invention to the chassis of a vehicle in which all the wheels are driven and employed for steering purposes. Figures 4 and 5 are broken views in front elevation and plan respectively showing a frame axle adapted to carry a road wheel employed for steering purposes only. Figures 6 and 7 are similar views showing a frame axle adapted to carry a road wheel employed for driving purposes only, and Figure 8 is a diagrammatic view showing the movements of a steering wheel as controlled by the torque or stay members. Figure 9 is a view of the connection of the stay members to the frame.

Throughout views similar parts are marked with like numerals of reference.

Referring to Figures 1, 2 and 3, the stub axles 1 carrying the road wheels 2 are mounted on elements 3, which in this case form the steering heads, which are carried by frame axles each of which consists of two superimposed rigid bars 4 and 5 arranged in parallel relation to one another, the upper one 5 being shorter than the lower one 4. The outer ends of each pair of bars 4 and 5 are connected to the element 3 by pivotal joints 6 and 7 of the "universal" type, and the inner ends of said bars are connected to brackets 8 and 9 respectively carried by the frame 29 of the undercarriage by similar joints 10 and 11. The outer ends of the bars 4 and 5 at or about their points of attachment to the element 3 are coupled to the frame 29 by means of links 12 and 13 which are superimposed and form together torque or stay members. These links are coupled to the bars 4 and 5 of the frame axle by pivotal joints 14 and 15 of the "universal" type, and to brackets 17 and 16 carried directly or indirectly by the frame 29 by similar joints 18 and 19. Theoretically the axes of the joints 18 and 19 should be in axial alignment with the axes of the joints 10 and 11 by which the inner ends of the bars 4 and 5 are pivoted to the frame 29 in order to insure that the castoring angle of the steering wheels remains constant, but as this is not always convenient the axes of said joints may be located approximate to said positions—as shown in Figures 2 and 3—without causing materially deviation of said angle.

In the constructions shown in Figures 4, 5, 6 and 7 the axes of the joints 18 and 19 by which the links forming each torque or stay member are connected to the frame 29 are arranged in axial alignment with the axes of the joints 10 and 11 by which the bars 4 and 5 are attached to said frame whereby the movements of the road wheels due to irregularities of the road surface, whether steering or driving wheels, are, as indicated in the diagrammatic view Figure 8, in the true vertical plane. It will be seen that with this method of mounting the road wheels both the propeller shafts and the links forming the torque or stay members maintain a uniform length under all conditions thereby dispensing with the use of telescopic driving shafts and telescopic torque or stay members.

It will be obvious that the frame axles may be arranged at any suitable or desired angle relative to the longitudinal centre line of the undercarriage other than at right angles as shown in the accompanying drawings.

In order to prevent the rising and falling movements of the road wheels arising from the irregularities of the road surface from imparting involuntary steering action to the road wheels the cross link 20 employed to connect the steering arms 30 carried by the steering heads 3 of each pair of steering road wheels is arranged in parallel relation to the members 4 and 5 of the frame axle and is formed in two parts the ends of each of which are connected respectively to the linkwork by which the controlling motion is imparted and to the steering arms 30 by joints 21 and 31 the axes of which are respectively in planes coincident with lines drawn between the axes of the joints 10 and 11 and 6 and 7 respectively.

In the arrangement shown in Figures 1, 2 and 3, the inner ends of the two parts of the cross link 20 are connected to swinging arms 22 which are coupled by a link 23, and motion is imparted to one of the arms 22 from the usual controlling hand wheel by means of the usual linkwork. In the arrangement shown in Figure 5, the inner ends of the two parts of the cross link 20 are connected to a central part 24 with which the link 25 of the usual linkwork operated by the controlling hand wheel is coupled through the rocking arm 26.

Suspension springs 27 of the usual type are employed and are connected by links 28 to one or other of the elements 4 and 5 forming each of the frame axles. In the construction shown in Figures 1, 2 and 3 the springs 27 are connected to the upper bars 4 and in the construction shown in Figures 4, 5, 6 and 7 they are connected to the lower bars 5 of the frame axles.

What I claim is:

1. In a motor road vehicle the combination of four independent axles for carrying the road wheels each of said axles consisting of two superimposed rigid bars and a stub axle carried by said bars, said bars being of unequal length, the upper one being the shorter, and pivotally attached both to said stub axle and to the frame of the undercarriage, the location of the points of pivot of the upper bar being at a greater distance from the longitudinal axis of the frame of the undercarriage than that of the lower bar; and of links connecting the outer ends of the two bars of each independent axle with the frame of the undercarriage said links being superimposed and of equal length.

2. In a motor road vehicle the combination of four axles for carrying the road wheels each of said axles consisting of two superimposed bars carrying a stub axle, said bars being of unequal length, the upper one being the shorter, and attached both to the stub axle for carrying one of the road wheels and to the frame of the undercarriage by pivots the location of that by which the upper bar is pivoted to said frame being at a greater distance from the longitudinal axis of said frame than the location of that by which the lower bar is pivoted to said frame; and of links connecting the outer ends of the two bars of each axle with the frame of the undercarriage said links being superimposed, of equal length and pivoted to said frame at points in axial alignment with the axes of the pivots by which the two bars of the axle are pivoted to the frame of the undercarriage.

3. In combination in a motor road vehicle, a frame for the undercarriage adapted to carry the running gear, independent non-rotating frame axles for each road wheel each of said axles consisting of two superimposed rigid bars carrying a stub axle, said bars being of unequal length, the upper one being the shorter one, and pivotally attached both to the frame of the undercarriage and to the stub axle the pivot of the upper bar being at a greater distance from the longitudinal centre line of said frame than the lower one; and links connecting the outer ends of the two bars of each of the frame axles to the frame of the undercarriage each pair of links being superimposed, and pivoted to the frame of the undercarriage.

4. In combination in a motor road vehicle, a frame for the undercarriage adapted to carry the running gear, independent non-rotating frame axles for each road wheel each of said axles consisting of two superimposed rigid bars carrying a stub axle, said bars being of unequal length, the upper one being the shorter one, and pivotally attached to the frame of the undercarriage—the upper one at a greater distance from the longitudinal centre line of said frame than the lower one—and to the stub axle; and links connecting the outer ends of the two bars of each of the frame axles to the frame of the undercarriage each pair of links being superimposed, of equal length and pivoted to the frame of the undercarriage.

5. In combination in a motor road vehicle, a frame for the undercarriage adapted to carry the running gear, independent non-rotating frame axles for each road wheel each of said axles consisting of two superimposed rigid bars carrying a stub axle for one of the road wheels, said bars being of unequal length, the upper one being the shorter one, and pivotally attached to the frame of the undercarriage—the upper one at a greater distance from the longitudinal centre line of said frame than the lower one—and to an element carrying the stub axle; and links connecting the outer ends of the two bars of each of the frame axles to the frame of the undercarriage each pair of links being superimposed, of equal length, arranged in parallel relation to one another and pivoted to the frame of the undercarriage.

6. In combination in a motor road vehicle, a frame for the undercarriage adapted to carry the running gear, independent non-rotating frame axles for each road wheel each of said axles consisting of two superimposed rigid bars carrying a stub axle, said bars being of unequal length, the upper one being the shorter one, and pivotally attached both to the stub axle and to the frame of the undercarriage, the upper one at a greater distance from the longitudinal centre line of said frame than the lower one; and two superimposed links connecting the outer ends of the two bars of each of the frame axles to the frame of the undercarriage, said links being pivoted to the frame of the undercarriage in such positions that the axes of the pivots of said connections are in alignment with the axes of the pivots by which the bars comprising the frame axle are respectively pivoted to the frame of the undercarriage.

7. In a motor road vehicle the combination of four non-rotating axles for carrying the road wheels each of said axles comprising two rigid bars of unequal length and a stub axle, the shorter bar being located above the lower bar, said bars being pivoted both to said stub axle and to the frame of the undercarriage the point of pivot of the lower bar to said frame being adjacent to the longitudinal centre line of said frame and that of the upper one at a distance from said centre line; torque and stay members connecting the outer ends of the bars constituting each of the non-rotating axles with the frame of the undercarriage; and suspension springs connected to one of the bars constituting each non-rotating axle by a link.

8. In a motor road vehicle the combination of four non-rotating axles for carrying the road wheels each of said axles comprising two rigid bars of unequal length and a stub axle connected to said bars by a steering head the shorter bar being located above the lower one, said bars being pivoted both to said steering head and to the frame of the undercarriage, the point of pivot of the lower bar to said frame being adjacent to the longitudinal centre line of said frame and that of the upper one at a distance from said centre line; torque and stay members connecting the outer ends of the bars constituting each of the non-rotating axles with the frame of the undercarriage; suspension springs connected to one of the bars constituting each non-rotating axle by a link; and coupling mechanism between each pair of steering wheels comprising a two-part link connecting the steering arms carried by the steering heads of the wheels to the linkwork connecting said two part link with the mechanism of the hand control of the steering gear, the points of pivot of the adjacent ends of the two parts of said link being in a plane coincident with a line drawn between the axes of the joints by which the two members of the non-rotating axle are pivoted to the frame of the undercarriage.

9. In a motor road vehicle the combination of four non-rotating axles for carrying the road wheels each of said axles comprising two rigid bars and a stub axle connected to said bars by a steering head, said bars being of unequal length, the shorter one being located above the lower one, and pivoted both to the steering head of the stub axle and to the frame of the undercarriage the point of pivot of the lower bar to said frame being adjacent to the longitudinal centre line of said frame and that of the upper one at a distance from said centre line; torque and stay members connecting the outer ends of the bars constituting each of the non-rotating axles with the frame of the undercarriage, said torque and stay members being pivoted to said frame in such positions that the axes of the pivots of said members are in alignment with the axes of the pivots by which the bars of the non-rotating axle are pivoted to the frame of the undercarriage; suspension springs connected to one of the bars constituting each non-rotating axle by a link; and coupling mechanism between each pair of steering wheels comprising a two part link connecting the steering arms carried by the steering heads to the link-work by which the two-part link is connected with the mechanism of the hand control of the steering gear, the points of pivot of the respective ends of the two parts of said link being in planes coincident with lines drawn between the axes of the joints by which the two members of the non-rotating axle are pivoted respectively to the frame of the undercarriage and to the steering head carrying the stub axle.

ALEXANDER ALBERT HOLLE.